Oct. 14, 1930. W. G. WEHR Re. 17,830

SWITCH

Original Filed Sept. 26, 1925 2 Sheets-Sheet 1

Inventor
William G. Wehr
Lewis Hudson & Kent
Attorneys.

Oct. 14, 1930. W. G. WEHR Re. 17,830

SWITCH

Original Filed Sept. 26, 1925 2 Sheets-Sheet 2

William G. Wehr Inventor

Lewis Hudson & Kent Attys.

Reissued Oct. 14, 1930 Re. 17,830

UNITED STATES PATENT OFFICE

WILLIAM G. WEHR, OF EAST CLEVELAND, OHIO, ASSIGNOR TO THE CLEVELAND CRANE & ENGINEERING CO., OF WICKLIFFE, OHIO, A CORPORATION OF OHIO

SWITCH

Original No. 1,580,546, dated April 13, 1926, Serial No. 58,732, filed September 26, 1925. Application for reissue filed May 26, 1927. Serial No. 194,500.

This invention relates to switches for overhead monorail carrier systems and more particularly to switches of the type in which a pivoted rail section is employed to connect a main line selectively with either a right or a left branch or with a single right or left branch only.

In over head carrier installation, switches of the pivoted type are commonly employed at the junction of a main line with branch lines to the right and left thereof to permit carriers to pass along the main line or to be deflected to one of the branch lines at the right and left thereof. Other switches of the same type are employed for connecting a main line with a single branch line which may be located either to the right or left thereof and also for connecting the end of one line to either of two lateral branches. Heretofore it has been necessary to provide different switches for each of the four different connections, i. e., there have been three-way switches and two-way switches of the right hand type, of the left hand type and of the Y type.

It is an important object of the present invention to provide a single switch of the pivoted type which may be used as a three-way switch, as a right or left hand two-way switch, or as a Y switch, so that when track layouts are changed the switch is adaptable to any of the four positions.

A further object of the invention is to provide a switch of the pivoted type in which the end of the main track rail is so joined to the end of the pivoted rail section that there is no gap between the adjacent ends of the carrier supporting flanges of the fixed and pivoted rail sections when the switch rail is positioned at an angle to the main rail.

With the above and other objects in view, the invention may be said to comprise the switch as illustrated in the accompanying drawings hereinafter described and particularly set forth in the appended claims, together with such variations and modifications thereof as will be apparent to one skilled in the art to which the invention appertains.

Figures 1, 2:
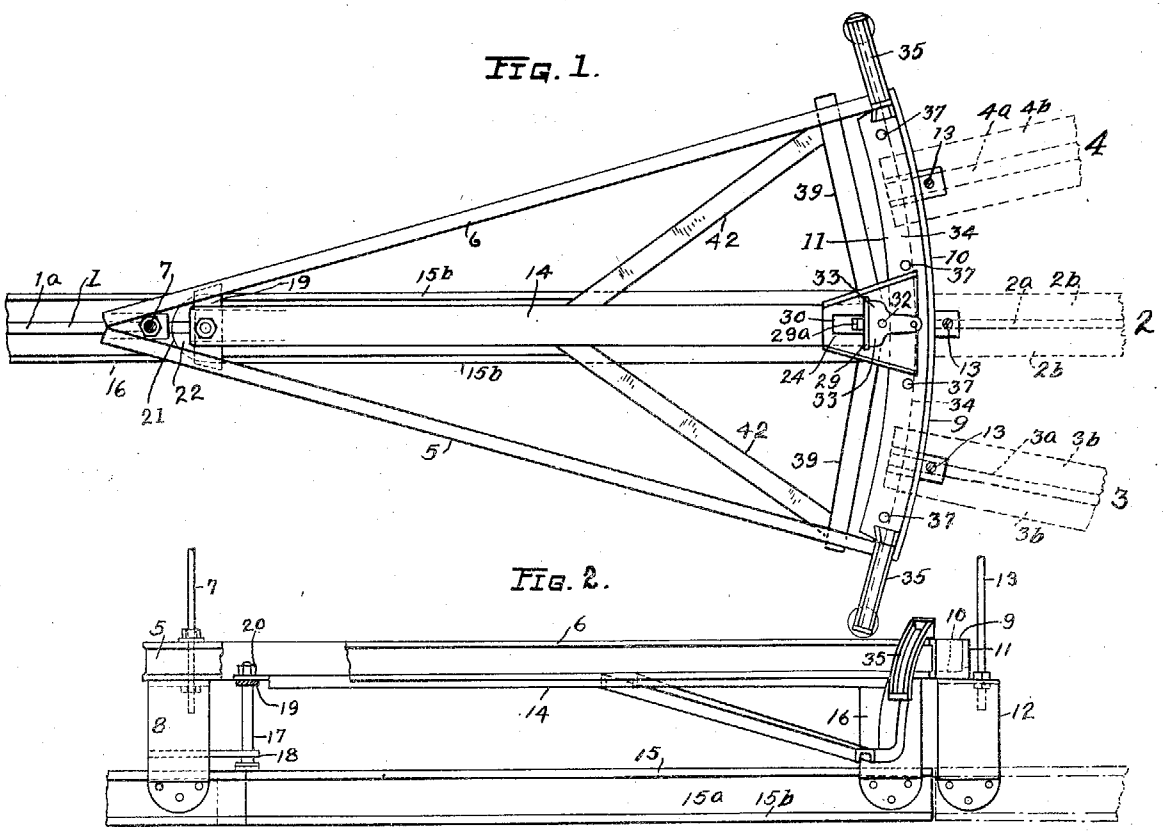
Figure 3:
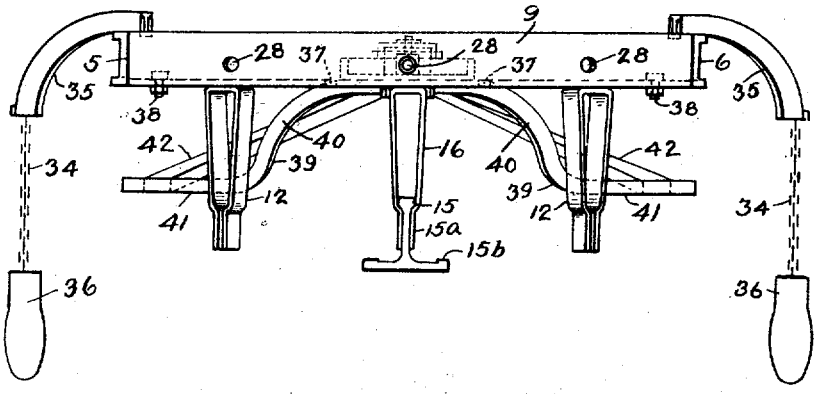
Figure 4:
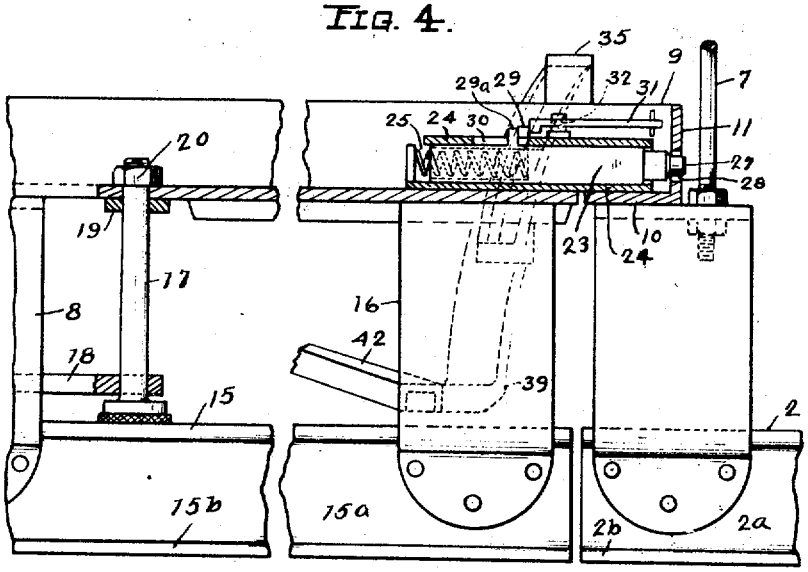

Reference should be had to the accompanying drawings forming a part of the specification. Fig. 1 is a top plan view of the switch; Fig. 2 is a side elevation; Fig. 3 is a front elevation; and Fig. 4 is a longitudinal section taken through the pivoted switch member.

Referring to the accompanying drawings, the main track section leading to the switch is indicated by the numeral 1 and the aligned main track section at the opposite end of switch is indicated by the numeral 2, and the lateral branch tracks leading away from the switch are indicated by the numerals 3 and 4. The tracks are monorail tracks each rail being in the form of a T bar, the rail 1 having a web $1^a$ and lateral flanges $1^b$ upon which the carrier wheels run, and the rails 2, 3 and 4 being of the same cross section as rail 1 having webs $2^a$, $3^a$ and $4^a$, and lateral flanges $2^b$, $3^b$ and $4^b$.

The switch has a rigid supporting frame which is substantially triangular in shape and has converging side bars 5 and 6 which are secured together at the apex of the frame, the frame being supported at the apex by means of a suspension rod or bolt 7 and the end of the rail 1 being supported from the apex of the frame by means of a hanger 8 rigidly secured to the under side of the frame. The opposite ends of the side bars 5 and 6 are connected by an arcuate angle bar 9 which has an inwardly extending horizontal flange 10 and a vertical flange 11. Three spaced rail hangers 12 are rigidly secured to the under side of the bar 9 and support the ends of the rails 2, 3 and 4 leading away from the switch, each hanger 12 being connected to the lower end of a suspension rod 13. The switch supporting frame is supported by the suspension rod 7 at one end and by the three suspension rods 13 at the opposite end and also supports the ends of all the rails leading to and from the switch.

A pivoted switch member is mounted upon the triangular supporting frame and this switch member comprises an upper supporting bar 14 and a rail section 15, which is rigidly secured to the upper bar and lies beneath the same in the plane of the fixed track rails. The switch member is pivoted adjacent the apex of the supporting frame and the free end thereof is slidably supported upon the arcuate angle bar 9 the free end of the upper bar 14 being slidably upon the inwardly extending flange 10 of the arcuate bar. The rail section 15 is suspended adjacent the free end thereof by a hanger 16 which is rigidly secured to the under side of the upper bar 14. At the opposite end of the rail section a vertical pivot post 17 is rigidly secured to the top thereof and this pivot post extends through and is rotatable in a fixed horizontal plate 18 secured to the hanger 8 and a horizontal plate 19 secured to the under sides of the side bars 5 and 6 of the frame adjacent the apex thereof. The inner end of the upper bar 14 rests upon the top of the plate 19 and the post 17 extends through the end of the bar 14 and is provided with a nut 20 at its upper end by means of which the pivot post and the rail section to which it is rigidly attached are supported. The switch section swings about the post 17 as a pivot and the free end thereof may be moved along the supporting bar 9 to position the rail section 15 in alignment with any one of the rails 2, 3 or 4 leading from the switch.

The pivot post 17, as will be readily seen in Figs. 1 and 2, is positioned a short distance from the end of the rail section 1 and adjacent the end of the rail section 15 which is cut upon an arc the center of which is at the pivotal axis of the switch member. The rail section 1 is cut to substantially the same curvature so that the convex end of the rail section 15 fits into the concave end of the rail 1, and, since the contiguous end faces are concentric with their center of curvature at the pivotal axis about which the rail section 15 swings, the flanges $1^b$ of the rail 1 and $15^b$ of the rail section 15 will always be contiguous to each other regardless of the angle at which the rail section 15 is positioned with respect to the fixed rail 1, and carriers will pass smoothly from the fixed rail to the switch rail in any position of adjustment of the switch rail.

At its free end, the upper bar 14 of the pivoted switch member, carries a latch bolt 23 which extends longitudinally of the bar 14 and is slidably mounted in a casing 24 secured upon the upper side of the bar. The latch bolt 23 normally projects beyond the end of the bar 14 and is pressed outwardly by a coil spring 25 interposed between the rear end of casing 24 and the bolt. The outer end 27 of the bolt 23 is reduced and tapered to enter apertures 28 in vertical flange 11 of the bar 9. The apertures 28 are located one directly above each of the three rails 2, 3 and 4, and when the latch bolt 23 engages in one of these apertures, the rail section 15 is locked in alignment with one of the outgoing rails. The bolt 23 has attached thereto a transverse abutment bar 29 which projects laterally to opposite sides of the bolt and is movable upon the top surface of the casing 24, the bar 29 being attached to a lug $29^a$ fixed to the bolt and projecting through a slot 30 in the top of the casing 24. A lever 31 is mounted to swing upon a vertical pivot 32 upon the top of casing 24 forwardly of the abutment bar 29, and this lever has a widened inner end which bears against the abutment bar 29, the widened inner end of the lever providing actuating projections 33 upon opposite sides of pivot 32 so that when the lever 31 is rocked in either direction the latch bolt 23 is pushed inwardly to releasing position. This spring 25 normally holds the bolt 23 in locking position and the pressure of the abutment bar 29 against the inner end of the lever normally holds the lever in its intermediate position. Two actuating cables 34 are attached to the outer end of the lever 31 and extend laterally in opposite directions therefrom and over arcuate channel guides 35 secured to the tops of the side bars 5 and 6 and extend outwardly and downwardly therefrom. The free ends of the cables 34 hang vertically from the channel guides 35 and have handles 36 attached to their lower ends. By pulling downwardly upon one or the other of the cables 34, the lever 31 is rocked upon its pivot to push the latch bolt 23 to retracted position freeing the pivotal switch member from the supporting bar 9 and after the bolt is released further pull will shift the switch member about its pivot toward the side of the supporting frame from which the operating cable 34, which is being pulled, hangs. The switch member may thus be released and swung to the right or left by pulling upon the operating cable which hangs from the right or left side of the supporting frame.

The switch may be used as a three-way switch leading to the three outgoing rails 2, 3 and 4 as shown in Fig. 1, or any one of the three rails may be omitted and the switch may be used as a right hand, a left hand or a Y switch, depending on the rail which is omitted. In order to adapt the switch to be used as a two-way right or left hand switch, means is provided for limiting the movement of the pivoted switch member so that the rail 15 aligns with the two outgoing rails when in its extreme positions on the arcuate supporting bar 9. The horizontal flange 10 of the supporting bar 9 is provided with four apertures 37 which are adapted to receive removable stop members 38 which are engaged by, and limit the movement of the upper bar 14 of the switch member. When the switch is used as a three-way switch the two stop members 38 are positioned in the outermost apertures 37 and are engaged by the bar 14 when the rail 15 is in alignment with the rails 3 and 4. If the switch is to be used as a two-way right hand switch, the stop member 38 at the left hand end of the supporting bar 9 is moved to the aperture 37 immediately to the left of the center rail 2 so that the switch member be permitted to move from a position in alignment with the rail 2 to position in alignment with the rail 3. If the switch is to be used as a left hand two-way switch, the stop member 38 at the right hand end of supporting bar 9 will be moved to the intermediate aperture immediately to the right of center rail 2, permitting the switch member to be moved from a position in alignment with the rail 2 to a position in alignment with rail 4. If the switch is to be used as a Y switch, the center rail 2 will be omitted and the central aperture 28 in the vertical flange 11 of the supporting bar will be closed by a suitable plug so that the switch member will not be locked in the intermediate position.

In order to prevent carriers from running off the ends of the two rails connected to the supporting bar 9 which are not in alignment with the rail section 15 of the switch, the upper bar 14 of the switch member has rigidly attached thereto a pair of oppositely extended blocking arms 39 which have downwardly and outwardly curved inner end portions 40 and horizontal end portions 41 which extend in front of the ends of the rails to either side of the switch member, the curved or arched portions 40 of the arms providing sufficient clearance upon opposite sides of the rail section 15 to permit carriers to pass over the rail section 15 beneath the arms. When the rail section 15 is in the central position as shown in Figs. 1 and 3, the horizontal portions 41 of the arms 39 lie immediately in front of the open ends of the rails 3 and 4. When the switch is shifted to extreme left or right hand position, the arm 39 extending to the left or right, as the case may be, blocks both the rails to the left or right of the switch member. In order to rigidly support the arms 39 and withstand the impact of carriers against the arms, the outer ends of the arms are connected by rigid braces 42 with the support bar 14.

Having described my invention, what I claim is:

1. A switch for overhead tracks of the monorail type comprising a rigid substantially triangular supporting frame having converging side bars secured together at one end and an arcuate angle bar connecting the opposite ends, said bar having a vertical flange and an inwardly extending horizontal flange, a hanger for a fixed rail secured to the apex of the triangular frame, a plurality of hangers for fixed rails secured to the arcuate bar, a movable switch member mounted on the fixed supporting frame, said switch member comprising an upper bar pivoted at one end to the supporting frame adjacent the apex thereof and having its opposite end slidably supported on the horizontal flange of the arcuate bar, a rail section beneath the upper bar and rigidly secured thereto, and a latch carried by said upper bar and engageable with the vertical flange of the arcuate bar to hold the switch member in different angular positions on the supporting frame.

2. A switch for overhead tracks of the monorail type comprising a rigid substantially triangular supporting frame having converging side bars secured together at one end and an arcuate bar connecting the opposite ends, a depending rail hanger rigidly secured to the apex of the supporting frame, a plurality of rail hangers rigidly secured to the arcuate bar, a movable switch member comprising an upper bar and a rail supported beneath the upper bar, a hanger rigidly connecting the upper bar and rail section at one end, and a pivot post rigidly connected to the opposite end of the rail section and extending upwardly therefrom, a plate connecting the converging bars of the supporting frame and a second plate beneath the first and rigidly secured to the hanger fixed to the apex of the supporting frame, said upper bar resting upon the first mentioned plate and said pivot post passing through said plates and said upper bar.

3. A switch for overhead tracks of the monorail type comprising a rigid substantially triangular supporting frame having converging side bars secured together at one end and an arcuate bar connecting the opposite ends, a depending rail hanger rigidly secured to the apex of the supporting frame, a plurality of rail hangers rigidly secured to the arcuate bar, a movable switch member comprising an upper bar and a rail supported beneath the upper bar, and means adjacent the apex of the supporting frame for pivotally supporting said switch member, said upper bar of the switch member having its free end slidably supported on said arcuate bar, a spring latch carried by said upper bar and engageable with the arcuate bar to hold the switch member in different angular positions, a latch releasing member carried by said upper bar and adapted, when moved laterally in either direction, to engage said latch and move the same to releasing position, cables connected to said releasing member and extending laterally therefrom in opposite directions, and arcuate channel guides for said cables fixed to the opposite side bars of the supporting frame.

4. In an overhead monorail system, the combination with a fixed track rail and a plurality of laterally spaced track rails having their ends spaced from the end of the first rail of a rigid supporting frame having a hanger at one end for supporting the end of the first mentioned rail and an arcuate bar at the opposite end having hangers for supporting said laterally spaced rails, a switch member comprising an upper bar and a rail section beneath the same and secured thereto, said switch member being pivoted to the supporting member adjacent the end of the first mentioned track rail and said upper bar having its free end slidable on said arcuate bar of the supporting member, means for detachably securing the switch member in positions in which the rail section bridges the space between the first mentioned track rail and one of the laterally spaced track rails, and adjustable stop members on the arcuate bar in the path of movement of the upper bar of the switch member for limiting the movement of the switch member.

5. A switch comprising a supporting frame having an arcuate bar at one end provided with spaced apertures, a switch member pivoted to the frame and having its free end slidable on said arcuate bar, and stop pins adapted to be secured in any of the apertures of the arcuate bar so as to project into the path of movement of said switch member to limit the angular movement thereof.

6. A switch comprising a supporting frame having an arcuate bar at one end provided with a series of spaced latch receiving apertures and a second aperture adjacent certain of the latch receiving apertures, a switch member pivoted at one end of the frame and having its opposite end slidable upon said arcuate bar, a latch carried by the switch member and adapted to engage any one of the latch receiving apertures of the bar to lock the switch member in its different positions, and a pin adapted to be detachably secured in any one of the apertures adjacent a latch receiving aperture so as to project into the path of movement of said switch member to limit the movement of said switch member in either direction.

7. In a switch for suspended track in combination, two supporting members spaced apart horizontally from each other, a cross member supported by and spanning the space between the said spaced members, a movable track section connected to and disposed beneath the said cross member in position to span the space between a stationary track and any one of a plurality of oppositely disposed stationary tracks, and track guard means carried by the said cross member in position to obstruct tracks out of alignment with the said movable track section, the said track guard means including a guard member disposed transversely of the said cross member in guarding position with respect to a stationary track, and a brace member extending from the said guard member to the said cross member.

8. In a switch for suspended track in combination, two supporting members spaced apart horizontally from each other, a cross member supported on one member and slidable on the other member, a movable track section beneath the cross member, and brackets connecting the cross member and track section, one of the said brackets being pivotally joined to a fixed track.

WILLIAM G. WEHR.